(No Model.)

D. BIGGS.
FILTER.

No. 315,463. Patented Apr. 14, 1885.

WITNESSES:

INVENTOR:
D. Biggs
BY Munn &Co
ATTORNEYS.

UNITED STATES PATENT OFFICE.

DAVID BIGGS, OF CASTLETON CORNERS, NEW YORK.

FILTER.

SPECIFICATION forming part of Letters Patent No. 315,463, dated April 14, 1885.

Application filed April 11, 1884. (No model.)

*To all whom it may concern:*

Be it known that I, DAVID BIGGS, of Castleton Corners, in the county of Richmond and State of New York, have invented a new and Improved Filter, of which the following is a full, clear, and exact description.

The object of my invention is to provide a new and improved filter which is simple in construction, effective in use, can be cleaned easily, and can be connected with the water-pipe very readily.

The invention consists in a vessel divided into two compartments by a vertical partition, each compartment containing a filtering medium and being provided with a separate outlet-cock, and the vessel is provided with an inlet-pipe having a three-way cock by means of which water can be admitted into either compartment of the vessel.

Reference is to be had to the accompanying drawings, forming part of this specification, in which similar letters of reference indicate corresponding parts in all the figures.

Figure 1:
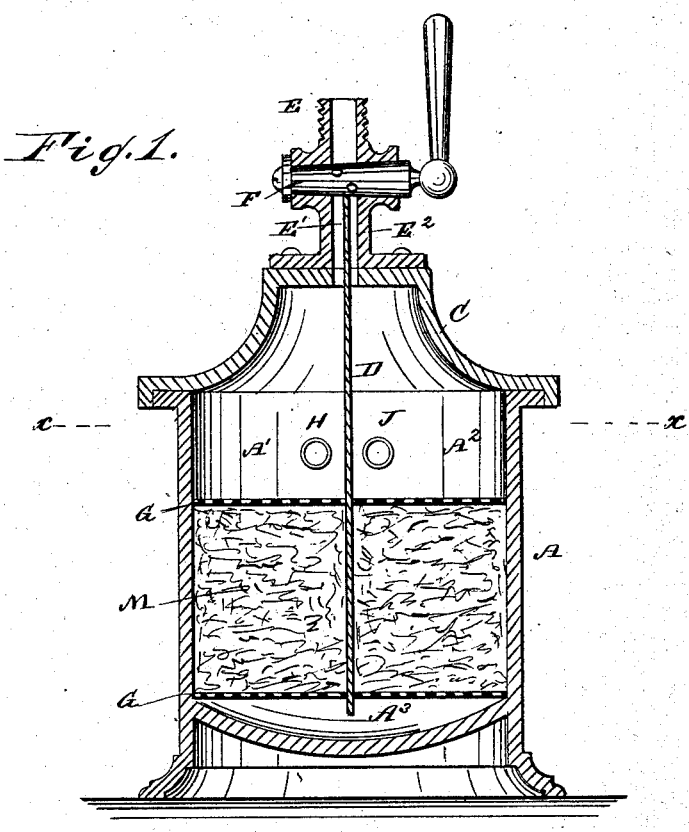
Figure 2:
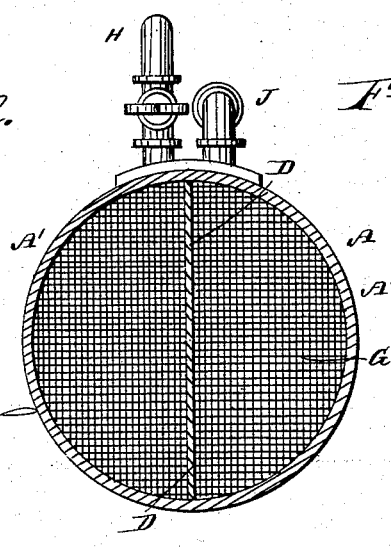
Figure 3:
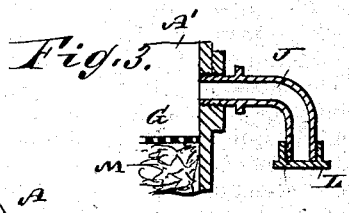

Figure 1 is a cross-sectional elevation of my improved filter. Fig. 2 is a sectional plan view of the same on the line $x$ $x$, Fig. 1. Fig. 3 is a longitudinal sectional elevation of the cock for drawing off the dirty water.

A cylindrical or like vessel, A, provided with a suitable cover, C, is divided into two or more compartments, A' A², by a vertical partition, D, extending from the top of the cover to within a short distance from the bottom, which is curved or made concave. An inlet-pipe or neck, E, is secured on the top of the cover, and has its upper end screw-threaded for coupling a water-pipe to it.

The neck or pipe E is provided with a three-way cock, F, by means of which water can be admitted either into the channel E' or the channel E², leading, respectively, to the compartments A' and A², or the water can be shut off altogether.

Two horizontal screens, G, or perforated plates are held a short distance from the bottom of the vessel and about one-third of the height of the vessel or more or less from the top, and between the screens powdered corundum or any other suitable filtering medium, M, is held.

The compartment A' is provided near its top with an outlet-cock, H, and the chamber A² is provided near its top with an outlet-cock, J, or with an outlet-pipe having a cap, L, screwed on its end.

The operation is as follows: If water is to be filtered, the cock F is turned in such a manner that the water passes from the pipe E through the channel E² into the chamber A², down through the filtering medium into the chamber A³, under the partition D, up through the filtering medium in the chamber A', and out through the cock H.

If the filter is to be cleaned, the cock H is closed, and the cock F is turned to cause the water to flow from the pipe E through the channel E' into the chamber A', down through the filtering medium into the chamber A³, under the partition D, up through the filtering medium in the chamber A², and out through the cock or pipe J. The flow of the water is thus reversed, and all impurities, &c., are washed out of the filtering medium. If the water is not to be filtered, the cock F is turned to admit the water through the channel E' into the chamber A' directly, and the cock H is opened. Then the water will not pass through the filtering medium, the outlet or wash-out pipe being kept closed.

I am aware that a filter made eccentric in shape, having an annular space increasing in diameter, has been centrally and vertically divided by a diaphragm into two compartments, the filter at the top and bottom being provided with a screen extending on each side of the diaphragm; and I therefore do not claim such invention.

Having thus described my invention, I claim as new and desire to secure by Letters Patent—

A filter made substantially as herein shown and described, and consisting of an upright cylindrical vessel divided into two compartments by an upright partition extending from the top to within a short distance of the bottom of the vessel, each compartment containing a filtering medium which is held between two perforated plates, of which the lower one is a short distance above the bottom of the partition, and each compartment having a separate outlet-cock at the side, and at the top of the vessel an inlet-pipe having a three-way cock, by means of which water can be admitted into either compartment, as set forth.

DAVID BIGGS.

Witnesses:
OSCAR F. GUNZ,
C. SEDGWICK.